(Model.)
J. E. WELCH.
WAGON SEAT FASTENER.
No. 247,862. Patented Oct. 4, 1881.
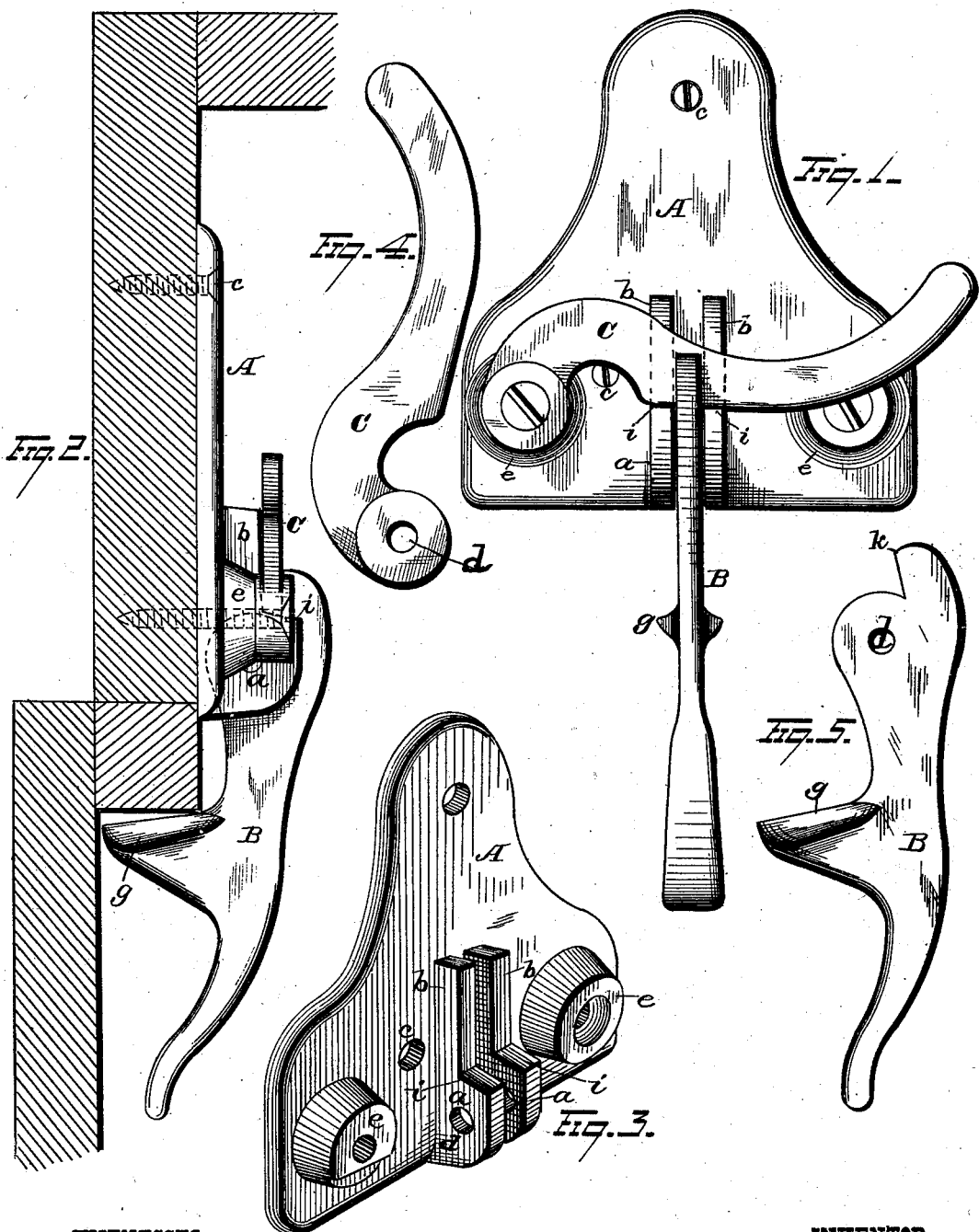

UNITED STATES PATENT OFFICE.

JOHN E. WELCH, OF BOONVILLE, MISSOURI.

WAGON-SEAT FASTENER.

SPECIFICATION forming part of Letters Patent No. 247,862, dated October 4, 1881.

Application filed April 30, 1880. (Model.)

*To all whom it may concern:*

Be it known that I, JOHN E. WELCH, of Boonville, in the county of Cooper and State of Missouri, have invented a new and useful device for securely fastening wagon-seats upon spring-wagons in any desired position; and I do hereby declare that the following is a full, clear, and exact description of the construction and operation thereof, reference being had to the annexed drawings, making a part of this specification, in which—

Figure 1 is a perspective view of the fastener. Fig. 2 is a sectional view of the same properly attached to end of seat and fastened to wagon-body. Fig. 3 represents the plate of the fastener. Fig. 4 is the catch or key, and Fig. 5 is the lever.

My invention consists of a fastener so constructed that when attached to the inside end of a spring-wagon seat the seat may be fastened in a firm and secure manner to the wagon-body, and is so arranged that the seat may be shifted back or forward, as may be desired, at any convenient distance from the front or rear end of the wagon and securely fastened.

The fastener is composed of three parts, viz: Plate A, Fig. 1, lever B, Fig. 5, and catch C, Fig. 4, and may be made of malleable iron or other suitable material.

Plate A, Fig. 1, may be of any desirable shape, with a flat inside surface, so as to secure it with screws $c\ c\ c$ to the inside end of seat. Upon the outer surface of said plate A a groove or slot, $a$, is formed by parallel projections $b\ b$ equidistant from the sides of said plate and extending upward to about the center thereof, said projections being wider and forming a deeper slot at the lower portion thereof, where the lever B is secured therein by a pivot at $d$, the groove or slot extending through the plate. The face or outer surface of said plate is also provided with projections thereon, near the corners, at $e\ e$.

The lever B is constructed so as to fit into slot $a$, and is secured therein by a pivot at $d$, and is provided with a lip, $g$, and is formed at the upper end so as to extend above the deeper portion of slot $a$ at $i\ i$, so that when in a perpendicular position to admit of the catch or key C, Fig. 4, between the end of said lever and the upper portion of said projections $b\ b$, and thereby securing said lever in position. The lip $g$ of lever B is made slightly convex, so as to secure a better hold upon the rail of the wagon bed or body.

The catch or key C, Fig. 4, is secured to plate A at the projections $e\ e$, on either corner thereof, by a screw or pivot extending through the plate and into the wagon-seat. The object of this catch or key is to secure or lock lever B after the latter has performed its office in fastening the seat to the wagon-body by forcing the lip $g$ of said lever B under the rail of the wagon bed or body. The said catch C secures the lever B firmly in position after the seat has been fastened and prevents said lever from oscillating or jolting out.

In order to move or shift the seat after it has been fastened, all that is necessary to do is to raise the catch C upward, pull out lever B, when the seat may be shifted to any desired position upon the wagon-body, and may be again securely fastened thereto by forcing the lip $g$ of lever B under the rail of the wagon-body and allowing catch C to drop back in position, as seen in Fig. 1. The end of catch C, where it is pivoted to plate A on projections $e$, is thicker or heavier than the other portion thereof, and may be used on either of said projections $e\ e$, as desired.

What I claim as my invention, and desire to secure by Letters Patent, is—

In a seat-fastener for carriages and wagons, the plate A, provided with projections $b\ b$, forming shoulder $i\ i$, for the reception of catch or key C, in combination with lever B, pivoted between the ears $a\ a$ and formed at the extreme end with the tail-piece $k$, and near its center with lip $g$, resting under the rail, all constructed and arranged to operate as shown and described.

JOHN E. WELCH.

Attest:
JOSEPH MAISBURGER,
HORACE T. MCMELLON.